Patented Feb. 8, 1944

2,341,016

UNITED STATES PATENT OFFICE 2,341,016

CONDENSATION OF ALDEHYDES WITH CARBOXYLIC ACIDS AND THEIR DERIVATIVES

Merlin Martin Brubaker, Boothwyn, Pa., assignor to E. I. du Pont de Nemours & Company, Wilmington, Del., a corporation of Delaware No Drawing. Application September 9, 1941,
Serial No. 410,167

19 Claims. (Cl. 260—345)

This invention relates to a catalytic vapor phase condensation process and, more particularly, to the catalytic condensation of aromatic aldehydes with carboxylic acid and their derivatives.

Condensations of the type exemplified by the Claisen and Perkin reactions and characterized by intermolecular dehydration between a carbonyl group and an active methyl or methylene group are traditionally liquid phase processes involving the use of a large amount of condensing agent which must be recovered for low-cost operation. The handling problems attendant upon batch operation and the frequently low yields add to the difficulties. In spite of these disadvantages, however, such liquid phase processes have heretofore constituted the most practical methods for the preparation of arylacrylic acids and their related compounds. As an example, the preparation of 2-vinylfurane from furfural has required two expensive and inconvenient steps consisting of the Perkin condensation of furfural with acetic anhydride to give furylacrylic acid followed by thermal decarboxylation of the acid to give 2-vinylfurane.

It is an object of this invention to devise a process for the preparation of arylacrylic acids and related compounds which is free from the defects of the prior art. Another object is to provide a method for the preparation of arylacrylic acids and related compounds by a relatively low cost process. Still another object is to develop a continuous process for the preparation of arylacrylic acids and related compounds. Other objects will be apparent from the following description of the invention.

These objects are accomplished by the following invention which comprises passing an aromatic aldehyde together with at least one mole of a compound selected from the class consisting of carboxylic acids which contain an active methylene group and compounds which upon hydrolysis yield such acids over a catalyst selected from the group consisting of the oxides, hydroxides, carbonates and carboxylic acid salts of alkali and alkaline earth metals at a temperature between about 200° and about 500° C. More specifically, this invention comprises passing a vapor mixture containing preferably 1 mole of an aromatic aldehyde and 2 moles of a substance of the class of carboxylic acids which contain an active methylene group and compounds which upon hydrolysis yield such acids, e. g., anhydrides, nitriles, esters, amides, etc., over a catalyst selected from the group of oxides, hydroxides, carbonates and carboxylic acid salts of the alkali and alkaline earth metals. These catalysts can be preformed or can be formed in situ in the reactor.

The reaction products are condensed in a cooled receiver placed at the bottom of the reaction tube. Purification of the products is effected by fractional distillation, preceded in some instances by a preliminary steam distillation.

In one embodiment of this invention the reactants are passed through a vertical reactor equipped with means for thermal control. This reactor contains the catalyst. For given conditions such as temperature, carboxylic acid component and catalyst, it is considered desirable to adjust the space velocity at which the reactants pass over the catalyst to that which will give the maximum yields of the products desired. The space velocity should be sufficiently high that the decomposition of the aromatic aldehyde, e. g., furfural, or the reaction products does not produce excessive fouling of the catalyst, but sufficiently low that a good conversion of the reactants per pass is obtained. In general, when using temperatures within the range 250° C. to 325° C. it is preferred to operate at space velocities of 50 to 200 since under these conditions the best yields of arylacrylic acids are obtained. Space velocities of from 25 to 250 are generally employed at temperatures within the range of 325° C. to 450° C. to obtain arylalkenes as the major reaction products.

In order to illustrate the preferred method of operating the invention with specific combinations of reactants, the following examples are given.

Example I

A mixture of 96 parts by weight of furfural and 120 parts by weight of glacial acetic acid is passed in the vapor phase at 350° C. through a tube containing a potassium acetate-on-silica gel catalyst. This catalyst is prepared by impregnating silica gel with an equal volume of 20% aqueous solution of potassium acetate according to the vacuum impregnation technique described in U. S. Patent 1,939,647. A space velocity of approximately 100 volumes of gas per unit volume of catalyst per hour is maintained. Upon steam distillation of the reaction product, 2-vinylfurane collects in the receiver as an upper layer. When furfural rather than vinylfurane begins to distill, distillation is interrupted and the entire distillate is neutralized with soda ash. The vinylfurane layer is separated, dried over calcium chloride, and purified by careful fractional distillation. The fraction boiling at 96° to 100° C. is 2-vinylfurane and is conveniently stored over hydroquinone to inhibit polymerization.

As an alternative method of purification, the product may be fractionally distilled without previous steam distillation. This procedure isolates the unreacted acetic acid and furfural as well as the vinylfurane. To remove acetic acid completely, the crude vinylfurane is washed with dilute caustic soda solution and redistilled.

Repetition of the above experiment using a mixture of 98 parts by weight of furfural and 172 parts by weight of crotonic acid at 320° C. leads to the isolation of a small but definite amount of 1-(alphafuryl)-1,3-butadiene. Decarboxylation of crotonic acid to propylene is an accompanying side reaction.

*Example II*

Example I is repeated using a catalyst consisting of barium oxide supported on silica gel. The catalyst is prepared by vacuum impregnating silica gel with 1.6 volumes of a saturated solution of barium nitrate in water, filtering off the excess liquid and drying the catalyst at 110° C. followed by ignition at 400° C. The conversion to 2-vinyl-furane is somewhat lower than that obtained at the same space velocity using an alkali metal acetate.

*Example III*

A mixture of 96 parts by weight of furfural and 204 parts by weight of acetic anhydride is passed in the vapor phase through a catalyst heated at 270° C. and prepared by vacuum impregnating silica gel with an equal volume of 20% aqueous solution of sodium acetate. A space velocity of approximately 130 volumes of gas per unit volume of catalyst per hour is maintained. A large temperature rise occurs locally in the catalyst, and this zone of maximum reaction moves slowly down the catalyst bed. Steam distillation of the product, as in Example I, yields a crude cut of 2-vinylfurane from which some acetone is separated by fractional distillation. Cooling of the residual liquid from the steam distillation yields furylacrylic acid, which after recrystallization melts at 141° to 142° C.

*Example IV*

A mixture of 96 parts by weight of furfural and 82 parts by weight of acetonitrile is passed in the vapor phase at 320° C. over a catalyst prepared by vacuum impregnating silica gel with an equal volume of a 5% aqueous solution of sodium carbonate. The space velocity is maintained at approximately 200 volumes of gas per unit volume of catalyst per hour. Upon fractional distillation of the product, furylacrylonitrile is obtained as a very light yellow liquid which boils at 86° to 91° C. at 10 mm. and solidifies to white needles melting at 38° C. Analysis shows a nitrogen content of 11.61% as compared with the theoretical value of 11.76% for furylacrylonitrile. The nitrile has a pronounced cinnamon odor and turns dark rapidly unless kept cold under nitrogen.

*Example V*

A mixture of 96 parts by weight of furfural and 148 parts by weight of methyl acetate is passed in the vapor phase at 380° C. over a catalyst prepared as in Example IV. The space velocity used is about 200 volumes of gas per unit volume of catalyst per hour. Careful fractional distillation of the product yields successive fractions of methyl acetate, 2-vinylfurane, unchanged furfural, and methyl furylacrylate. Methyl furylacrylate is obtained as a light yellow liquid which boils at 75° to 76° C. at 4 mm. and melts at 27° C.

*Example VI*

A mixture of 106 parts by weight of benzaldehyde and 120 parts by weight of glacial acetic acid is passed in the vapor phase at 395° C. through a tube containing a potassium acetate-on-silica gel catalyst prepared as in Example I. A space velocity of approximately 100 volumes of gas per unit volume of catalyst per hour is maintained. Upon steam distillation of the reaction product, styrene collects in the receiver as an upper layer. When benzaldehyde rather than styrene distills, the distillation is interrupted. The styrene layer is dried over anhydrous calcium chloride and purified by distillation under reduced pressure.

In the practice of this invention there may be used compounds which contain a methylene group joined directly either to a carboxyl group or to a group which is hydrolyzable to a carboxyl group; there may also be used carboxylic compounds which contain a methylene group joined by a single bond to a chain carbon sharing a plural bond with another carbon which is in turn directly attached to a carboxyl group or a group hydrolyzable to a carboxyl group. Methylene groups situated as described above are referred to herein as "active" methylene groups.

Carboxylic acids containing active methylene groups and which can be used in the practice of this invention include the straight chain aliphatic carboxylic acids, for example, acetic acid, propionic acid, butyric acid, caproic acid, and lauric acid; branched chain aliphatic carboxylic acids in which the branching occurs at a carbon atom farther removed from the carboxyl group than the alpha carbon atom, for example, isovaleric acid and isocaproic acid; dibasic acids such as malonic acid, succinic acid, and adipic acid; cyclic carboxylic acids in which a methylene group is attached directly to the carboxyl group, for example, phenylacetic acid, furylacetic acid, and hydrocinnamic acid; unsaturated carboxylic acids in which a methylene group is joined to a carboxyl group through one or more vinylene groups or substituted vinylene groups, for example, crotonic acid, sorbic acid, beta-ethylacrylic acid and tiglic acid; and unsaturated acids in which the unsaturation is farther removed from the carboxyl group than the alpha, beta position, for example, vinylacetic acid, 10,11-undecylenic acid, and oleic acid. In the condensation of an aromatic aldehyde with such acids, water is eliminated between the carbonyl oxygen of the aldehyde and the active methylene group of the acid to give a primary product of the type

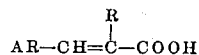

where AR represents the aryl group of the aldehyde and R represents that portion of the original acid exclusive of the active methylene and carboxyl groups. Subsequent decarboxylation can occur to the corresponding arylalkene,

In the practice of this invention any of the acids named above may be replaced by compounds which contain in place of the carboxyl group of the acid a group hydrolyzable to a carboxyl group; e. g., the nitriles, anhydrides, esters, amides, acid halides, etc. Thus, in place of acetic acid there can be used the acetic esters, acetic anhydride, acetonitrile, acetamide, or acetyl chloride. Similarly isovaleric acid can be replaced by an isovaleric ester, isovaleric anhydride, isovaleronitrile, isovaleryl chloride, or isovaleramide. It has been found that the compounds hydrolyzable to an acid which will condense with an aromatic aldehyde will also condense to give as primary products the corresponding derivatives of the unsaturated acid

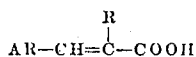

In some cases this primary product is partially hydrolyzed by the water produced in the condensation to give either the unsaturated acid or its decarboxylation product, the arylalkene.

Aldehydes which can be used in the process of this invention include those in which the aldehyde group is attached directly to an aromatic nucleus. Among such aldehydes are benzaldehyde and substituted benzaldehydes such as the tolualdehydes; furfural, and substituted furfurals such as 5-methyl-2-furaldehyde and 3,5-dimethyl-2-furaldehyde; naphthaldehydes and substituted naphthaldehydes; and aldehydo derivatives of pyridine, pyrrole, and similar aromatic nuclei.

The examples indicate the use of certain definite conditions of temperature, proportions of reactants, space velocities, contact times, catalyst volumes, etc. It is to be understood, however, that these values can be varied somewhat within the scope of the invention. As a catalyst for this reaction any oxide, hydroxide, carbonate, or carboxylic acid salt of an alkali or alkaline earth metal can be used. Generally, the catalyst is deposited on a suitable support such as silica gel, active carbon, pumice, alundum, alumina, fuller's earth, etc. The catalyst can be employed, however, in massive form if desired. The preferred class of catalysts are the supported alkali metal salts of monocarboxylic acids. The specific preferred catalyst is potassium acetate-on-silica gel. In reacting an aromatic aldehyde with a carboxylic acid, such as propionic acid, it is often advantageous to use the salt of the corresponding carboxylic acid, i. e., a metal propionate, as the catalyst for the reaction, although the acetate will effect condensation in all cases. Metal acetate catalysts are operable at a lower temperature than, for example, metal carbonates or alkaline earth metal oxides.

The process of this invention can be operated at temperatures within the range of about 200° to about 500° C. At temperatures below 200° C. reaction is incomplete and at temperatures above 500° C. thermal decomposition of the reactants and reaction products becomes serious and this results in a sharp decrease in the yield of desired products. When the process is operated to yield an arylacrylic acid or a substituted arylacrylic acid as the major reaction product the temperatures generally employed are those within the relatively restricted range of 250° C. to about 325° C. When the reaction products desired are the arylalkenes then the process is operated at temperatures from about 325° C. to about 450° C.

The process can be carried out either in the presence of an inert carrier gas such as nitrogen or an inert organic solvent, e. g., xylene, toluene, gasoline, etc. The use of an inert carrier gas or an inert organic solvent is desirable, since it permits operating at lower temperatures than is otherwise possible and this results in a reduction in yield losses of desired products.

In practicing the invention at least one mole of the acid component is used per mole of aldehyde. Generally the mole ratio of aldehyde to acid component is 1 to 2. Ratios outside these limits can be used, if desired.

The process is generally operated at atmospheric pressure but if desired superatmospheric or subatmospheric pressures can be used.

As many apparently widely different embodiments of this invention may be made without departing from the spirit and scope thereof, it is to be understood that this invention is not to be limited to the specific embodiments shown and described.

I claim:

1. The process which comprises passing an aromatic aldehyde together with at least one mole per mole of aromatic aldehyde of a compound selected from the class consisting of carboxylic acids which contain an active methylene group and compounds hydrolyzable to such acids over a catalyst selected from the group consisting of the oxides, hydroxides, carbonates and carboxylic acid salts of alkali and alkaline earth metals at a temperature between about 200° and about 500° C.

2. A process for producing arylacrylic acids which comprises passing an aromatic aldehyde together with at least one mole per mole of aromatic aldehyde of a compound selected from the class consisting of carboxylic acids which contain an active methylene group and compounds hydrolyzable to said acids over a catalyst selected from the group consisting of the oxides, hydroxides, carbonates and carboxylic acid salts of alkali and alkaline earth metals at a temperature between 250° and 325° C.

3. The process in accordance with claim 2 characterized in that the reactants are passed over the catalyst at a space velocity within the range of 50 to 200.

4. A process for producing arylalkenes which comprises passing an aromatic aldehyde together with at least one mole per mole of aromatic aldehyde of a compound selected from the class consisting of carboxylic acids which contain an active methylene group and compounds hydrolyzable to such acids over a catalyst selected from the group consisting of the oxides, hydroxides, carbonates and carboxylic acid salts of alkali and alkaline earth metals at a temperature between 325° and 450° C.

5. The process in accordance with claim 4 characterized in that the reactants are passed over the catalyst at a space velocity within the range of 25 to 250.

6. The process in accordance with claim 1 characterized in that the molar ratio of aldehyde to acid compound is approximately 1 to 2.

7. The process which comprises passing an aromatic aldehyde together with at least one mole per mole of aromatic aldehyde of a compound selected from the class consisting of carboxylic acids which contain an active methylene group and compounds hydrolyzable to said acids over a catalyst selected from the group consisting of the oxides, hydroxides, carbonates and carboxylic acid salts of alkali and alkaline earth metals at a temperature between 200° and 500° C., said process being further characterized in that the reaction is carried out in the presence of an inert diluent.

8. The process in accordance with claim 7 characterized in that the inert diluent is a carrier gas.

9. The process in accordance with claim 7 characterized in that the inert diluent is an organic solvent.

10. The process in accordance with claim 1 characterized in that the catalyst is an alkali metal salt of a monocarboxylic acid.

11. The process in accordance with claim 1 characterized in that the catalyst is an alkali metal acetate supported on silica gel.

12. The process in accordance with claim 1 characterized in that the catalyst is potassium acetate supported on silica gel.

13. The process in accordance with claim 1 characterized in that the aromatic aldehyde is furfural.

14. The process in accordance with claim 4 characterized in that the aromatic aldehyde is furfural.

15. The process which comprises passing furfural together with at least one mole per mole of furfural of acetic acid, over a catalyst selected from the group consisting of the oxides, hydroxides, carbonates and carboxylic acid salts of alkali and alkaline earth metals at a temperature between about 200° and about 500° C.

16. A process for producing furylalkenes which comprises passing furfural together with at least one mole per mole of furfural of acetic acid, over a catalyst selected from the group consisting of the oxides, hydroxides, carbonates and carboxylic acid salts of alkali and alkaline earth metals at a temperature between 325° and 450° C.

17. The process which comprises passing an aromatic aldehyde together with at least one mole per mole of aromatic aldehyde of acetic acid, over a catalyst selected from the group consisting of the oxides, hydroxides, carbonates and carboxylic acid salts of alkali and alkaline earth metals at a temperature between about 200° and about 500° C.

18. A process for producing arylalkenes which comprises passing an aromatic aldehyde together with at least one mole per mole of aromatic aldehyde of acetic acid, over a catalyst selected from the group consisting of the oxides, hydroxides, carbonates and carboxylic acid salts of alkali and alkaline earth metals at a temperature between 325° and 450° C.

19. The process which comprises passing an aldehyde selected from the group consisting of aromatic aldehydes and aldehydes in which the aldehyde group is attached directly to a nucleus selected from the group consisting of furane, pyridine, and pyrrole nuclei together with at least one mole per mole of aldehyde of a compound selected from the class consisting of carboxylic acids which contain an active methylene group and compounds hydrolyzable to such acids over a catalyst selected from the group consisting of the oxides, hydroxides, carbonates, and carboxylic acid salts of alkali and alkaline earth metals at a temperature between about 200° and about 500° C.

MERLIN MARTIN BRUBAKER.